United States Patent [19]

Oikawa et al.

[11] Patent Number: 4,945,193
[45] Date of Patent: Jul. 31, 1990

[54] GROMMET

[75] Inventors: Ryuetsu Oikawa; Akira Ikari, both of Shizuoka, Japan

[73] Assignee: Yazaki Corporation, Shizuoka, Japan

[21] Appl. No.: 284,289

[22] Filed: Dec. 14, 1988

[30] Foreign Application Priority Data

Dec. 16, 1987 [JP] Japan .......................... 62-189967[U]

[51] Int. Cl.⁵ ........................ H01B 17/30; H02G 3/22
[52] U.S. Cl. ................................ 174/153 G; 248/56; 277/178; 439/455
[58] Field of Search ................ 174/65 G, 135, 152 G, 174/153 G, 167; 16/2; 248/56; 277/166, 178, 189, 212 F, 212 FB; 439/453, 455, 556, 559, 565, 567

[56] References Cited

U.S. PATENT DOCUMENTS

| 4,718,680 | 1/1988 | Halconruy et al. | 277/212 FB |
| 4,797,513 | 1/1989 | Ono et al. | 174/153 G |
| 4,839,937 | 6/1989 | Oikawa et al. | 174/153 G X |

FOREIGN PATENT DOCUMENTS 59-25115  2/1984  Japan .............................. 174/153 G Primary Examiner—Laramie E. Askin
Attorney, Agent, or Firm—Sughrue, Mion, Zinn, Macpeak & Seas

[57] ABSTRACT

A grommet for sealing the clearance between a panel (P) and an electric cord (W) extending therethrough, the grommet having a locking portion (B) made of a hard resin including a lower part (9) having a center hole (9a), and upper annular wall (10) extending along the peripheral edge of the lower part (9), a base plate (11) provided at the top of the annular wall (10) and having a center hole (11a), and engaging tongues (12) provided on the annular wall (10); a soft portion (A) including an annular recess (6) fitted with the base plate (11) and a tube through which the electric cord is inserted; and electric cord fastening members (17) having stoppers (18) dimensioned so as to be prevented from passing through the holes (9a, 11a) of the lower part (9) and the base plate (11), the fastening members being secured to the cord so that the stoppers are located between the lower part (9) and the base plate (11).

4 Claims, 3 Drawing Sheets

GROMMET

BACKGROUND OF THE INVENTION

The present invention relates to a grommet for tightly sealing the clearance between a panel of a vehicle or the like and an electric cord inserted through a hole of the panel.

FIG. 1 shows a longitudinal sectional view of a grommet, disclosed in U.S. Pat. Ser. No. 217,029 filed on July 11, 1988, now U.S. Pat. No. 4,839,937, which tightly seals the clearance between a panel of a vehicle or the like and an electric cord inserted through a hole of the panel and supports the cord so that the cord is protected from damage. The grommet has a soft portion A including a base 1 shaped as a hollow disk and a cylindrical tube 2 provided at the inner circumferential edge of the base so that the electric cord W, which extends through the hole of the panel P and is supported by the grommet is inserted into the tube. A tape 3 is wound on the electric cord W and the tube 2 so that the cord and the tube are securely sealed to each other. A cylindrical peripheral wall 4 is provided at the outer circumferential edge of the base 1 opposite the tube 2. An annular support part 5 extends inward from the bottom of the peripheral wall 4 so that an annular recess 6 is defined inside the peripheral wall. Lips 7 and 8, which are located in contact with the panel P, are provided on the outside surface of the support part 5. The grommet also has a locking portion B made of hard resin and including a lower part 9 having a center hole, an upper annular wall 10 extending along the peripheral edge of the lower part, and a base plate 11 provided at the top of the annular wall and having a center hole. The annular wall 10 is partially cut and bent outwardly so that a plurality of engaging tongues 12 are formed.

The engaging tongues 12 have engaging steps 12a at the outside surfaces of the tips of the tongues. The tongues 12 are flexible such that the engaging steps 12a are engaged in the hole of the panel P as the tongues are elastically bent inward. The annular recess 6 of the soft portion A of the grommet is fitted with the base plate 11 of the locking portion B engaged in the hole of the panel P, so that the lips 7 and 8 are tightly fitted on the panel to seal it. As a result, the panel P and the electric cord W are sealed to each other so that rain water or the like cannot enter through the hole of the panel. Besides, the cord W is supported by the tube 2 so that the cord is protected from damage. However, when an external force F acts on the electric cord W, the cord and the tube 2 are displaced together in the direction of the force and the base 1 and the peripheral wall 4 are pulled in the direction of the force so that the base and the wall are displaced and deformed. Simultaneously, the lips 7 and 8 may separate from the panel P so that the sealing of the panel deteriorates. This presents a problem. If the base 1 and the peripheral wall 4 are pulled further in the direction of the force F, the annular recess 6 might dislodge from the base plate 11. This also presents a problem.

In order to solve these problems, one or a plurality of flat cord fastening parts 13 are provided to extend from the inner circumferential edge of the lower wall 9, and a tape 14 is wound on the fastening parts and the electric cord W. As a result, the locking portion B engaged in the panel P prevents the cord W from being displaced in the direction of the external force F and separating the soft portion A from the locking portion, because the external force acts on the cord to pull the soft portion and the locking portion together in the direction of the force. The problems are thus solved.

FIG. 2 shows a longitudinally sectional view of another grommet, also disclosed in the above-mentioned patent, which also tightly seals the clearance between a panel of a vehicle or the like and an electric cord inserted through a hole of the panel and supports the cord so that the cord is protected from damage. The grommet comprises a soft portion A and a locking portion B made of a hard resin and including a base plate 11 and an electric cord fastening part 16 coupled to the inner circumferential edge of the base plate by a flexible thin bendable part 15. The stopper 16a of the cord fastening part 16 is located near the outside surface of the lower part 9 of the locking portion B. A tape 14 is wound on the cord securing part 16 and the electric cord W. When an external force F acts on the cord W, the cord is moved in the direction of the force so that the stopper 16a comes into contact with the lower part 9 to prevent the cord from being moved further in the direction. Thus, movement of the cord W is minimized. The small extent of movement is absorbed by the small deformation of the curved joint of the base 1 and tube 2 of the soft portion A so that the lips 7 and 8 of the soft portion are prevented from separating from the panel P and the soft portion is prevented from separating from the locking portion B.

Although the electric cord fastening parts 13 of the conventional grommet shown in FIG. 1 have enough resistance to an external force G whose direction is inverse to that of the other external force F, the fastening parts are buckled, as shown in FIG. 3, if the external force F pulling the electric cord W is strong, so that the cord is moved in the direction of the force to separate the lips 7 and 8 from the panel P and possibly separate the soft portion A from the locking portion B. This is a problem.

Referring to FIG. 2, even if the external force F is strong the stoppers 16a of the halfway sections of the electric cord fastening parts 16 of the conventional grommet are supported by the lower part 9. Therefore, a compressive load only acts on the cord fastening parts under the stoppers so that it is less likely that the fastening parts will buckle. However, when an external force G, whose direction is inverse to that of the other external force F, acts on the electric cord W, as shown in FIG. 4, the thin bendable part 15 is likely to be severed. This is also a problem.

SUMMARY OF THE INVENTION

It is an object of the present invention to provide a grommet which does not have these problems.

In the grommet provided in accordance with the present invention, electric cord fastening members secured to an electric cord can be supported by the lower part or base plate of a locking portion of high mechanical strength so as to enable the grommet to withstand an external force acting on the cord. For that purpose, the electric cord fastening members, having stoppers sized so as to prevent the stoppers from passing through the holes of the lower part and the base plate, are secured to the electric cord so that the stoppers are located between the lower part and the base plate.

When the external force acts on the electric cord in one direction the stoppers of the electric cord fastening members of the grommet provided in accordance with the present invention are supported by the base plate of the locking portion. When the external force acts on the cord in the reverse direction, the stoppers are supported by the lower part of the locking portion. For these reasons, the extent of movement of the electric cord is minimized by the stoppers to maintain the proper waterproofing property of the grommet.

DETAILED DESCRIPTION OF THE INVENTION

An embodiment of the present invention is hereafter described with reference to FIGS. 5-8 of the drawings attached hereto.

Figure 1:
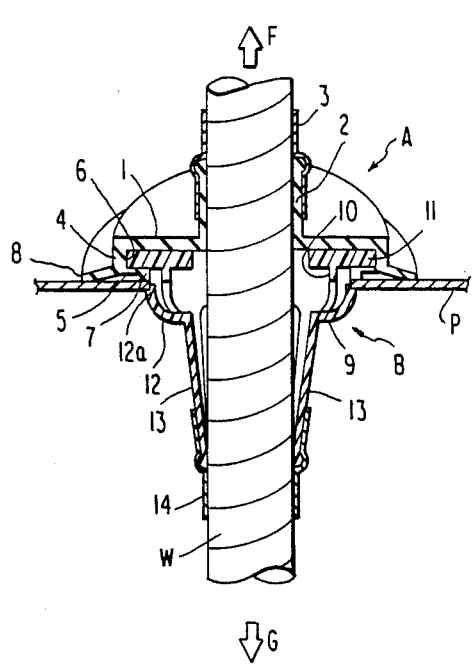
FIG. 1 is a longitudinal sectional view of a conventional grommet.
Figure 2:
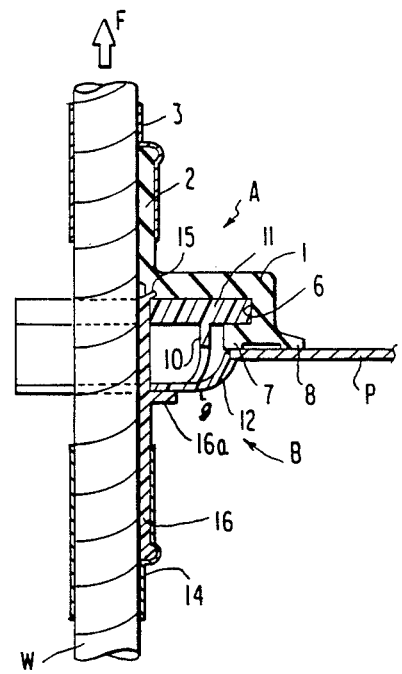
FIG. 2 is a longitudinal sectional view of another conventional grommet.
Figure 3:
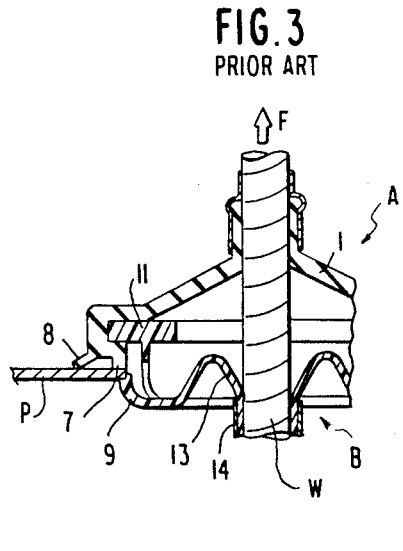
FIG. 3 is a longitudinal sectional view of the conventional grommet shown in FIG. 1 receiving an external force.
Figure 4:
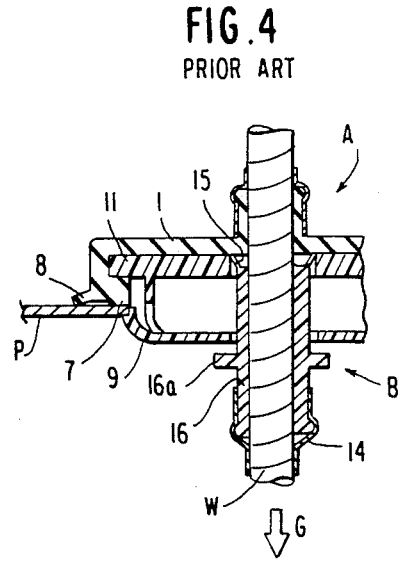
FIG. 4 is a longitudinal sectional view of the conventional grommet shown in FIG. 2 receiving an external force.
Figure 5:
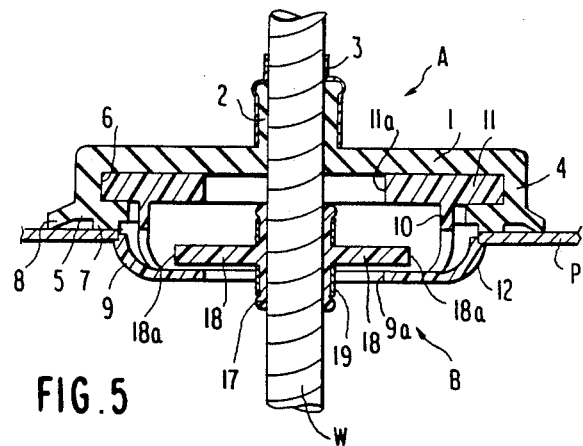
FIG. 5 is a longitudinal sectional view of a grommet which is an embodiment of the present invention.

FIG. 5 shows a longitudinal sectional view of a grommet according to a preferred embodiment of the invention. The grommet has a soft portion A including a base 1, a tube 2 provided at the inner circumferential edge of the base, a peripheral wall 4 provided at the outer circumferential edge of the base, and a support part 5 provided at the bottom of the peripheral wall so that an annular recess 6 is defined inside the wall. Lips 7 and 8 are provided on the outside surface of the support part 5. The grommet also has a locking portion B made of a hard resin and including a lower part 9 having a center hole 9a, an upper annular wall 10 provided at the peripheral edge of the lower part, a base plate 11 provided at the top of the annular wall and having a center hole 11a, and engaging tongues 12 provided on the annular wall.

Figure 8:
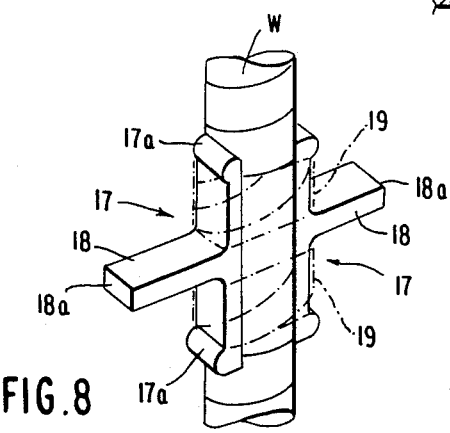
FIG. 8 is a perspective view of an electric cord with fastening members having stoppers.

Referring to FIG. 8, the grommet also has electric cord fastening members 17 each having projections 17a provided at both ends thereof so as to prevent a wound tape 19 from slipping off the fastening members. Each fastening member 17 is provided with a stopper 18 on the mid-portion thereof. Each of the stoppers 18 terminates in an end 18a and is sized so that the stoppers cannot pass through the center hole 9a of the lower part 9 or the center hole 11a of the base plate 11. The fastening members 17 are secured to the cord W in such a manner that the stoppers 18 are located between the lower part 9 and base plate 11 of the locking portion B and the tape 19 is wound around the cord and the fastening members, as shown in FIG. 5.

After the electric cord W, with the cord fastening members 17 secured thereto, is inserted through the tube 2, a tape 3 is wound on the cord and the tube. The annular recess 6 is thereafter fitted with the base plate 11 so that the soft portion A is combined with the locking portion B and the engaging tongues 12 are engaged in the hole of a panel P. The grommet is thus attached to the panel P so that the lips 7 and 8 are tightly fitted on the panel to seal the panel and the cord W to other by the grommet. The cord fastening members 17 are secured to the electric cord W so that the stoppers 18 are located between the lower part 9 and base plate 11 of the locking portion B and therefore cannot pass through the center hole 9a of the lower part and the upper hole 11a of the base plate, as shown in FIG. 5.

Figure 6:
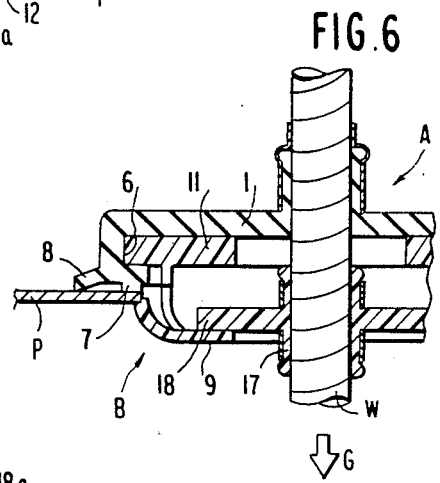
FIG. 6 is a longitudinal sectional view of the grommet of FIG. 5 receiving an external force G.

When an external force acts on the electric cord W in a direction G as shown in FIG. 6, the cord is moved in that direction but the stoppers 18 come into contact with the lower part 9 to prevent the cord from being moved further. For that reason, the extent of movement of the cord W is minimized, and the base 1 of the soft portion A is only slightly deformed elastically, so that the lips 7 and 8 are not separated from the panel P and the soft portion does not come off the locking portion B.

Figure 7:
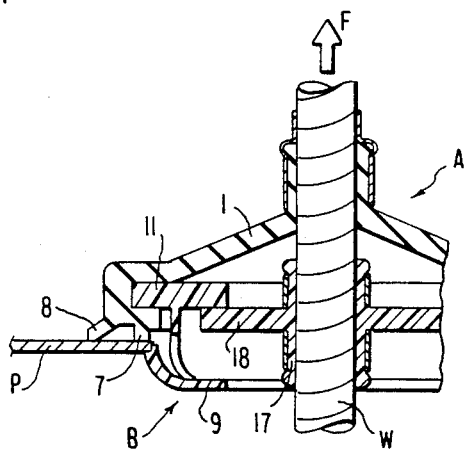
FIG. 7 is a longitudinal sectional view of the grommet of FIG. 5 receiving an external force F.

When an external force acts on the electric cord W in a direction F as shown in FIG. 7, the cord is pulled and moved by the force but the stoppers 18 come into contact with the base plate 11 to prevent the cord from being moved further. For that reason, the extent of movement of the cord W is minimized, and the base 1 of the soft portion A is only slightly deformed elastically, so that the lips 7 and 8 are not separated from the panel P and the soft portion does not come off the locking portion B.

Since the thickness of each of the stoppers 18 is large enough to enable the stoppers to withstand the external forces, the stoppers are not damaged.

According to the present invention, electric cord fastening members having stoppers sufficiently sized so as to prevent the stoppers from passing through the holes of the lower part and the base plate of the grommet are secured to an electric cord so that the stoppers are located between the lower part and the base plate. As a result, the resistance of the grommet to an external force acting on the cord is increased and the reliability of the grommet is thus enhanced.

What is claimed is:

1. A grommet for sealing the clearance between a panel and an electric cord extending therethrough, comprising:

a locking portion made of a hard resin, said locking portion including a lower part having a center hole, an annular wall provided at the peripheral edge of said lower part a base plate provided at the top of said wall and having a center hole, and engaging tongues provided on said walls;

a soft portion including an annular recess fitted with said base plate, and a tube for receiving therethrough an electric cord; and electric cord fastening members having stoppers dimensioned so as to be prevented from passing through said holes of said lower part and said base plate, said fastening members being securable to said cord so that said stoppers are located between said lower part and said base plate.

2. The grommet of claim 1, wherein each of said electric cord fastening members comprises a portion for securing said fastening member to said cord by winding tape around said portion and said cord, one of said stoppers extending outwardly from said portion.

3. The grommet of claim 2, wherein said fastening members are a pair of fastening members for securing to said cord on opposing diametric sides thereof.

4. The grommet of claim 2, wherein each of said fastening members has projections at opposing ends of said portion so as to prevent said wound tape from slipping off said fastening members.

* * * * *